United States Patent
Jun

(10) Patent No.: US 6,865,485 B2
(45) Date of Patent: Mar. 8, 2005

(54) METHOD AND APPARATUS FOR DETERMINING VEHICLE POSITION ON A MAP

(75) Inventor: Hyun-Joo Jun, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/386,078

(22) Filed: Mar. 10, 2003

(65) Prior Publication Data

US 2004/0039528 A1 Feb. 26, 2004

(30) Foreign Application Priority Data

Aug. 23, 2002 (KR) .................... 10-2002-0050083

(51) Int. Cl.$^7$ .............. G01H 5/00; G01S 3/02; G01S 13/89
(52) U.S. Cl. ............ 701/213; 701/200; 340/990
(58) Field of Search .................. 701/200, 213, 701/205, 206, 207, 208, 210; 342/357.08; 180/167, 170; 340/990, 995.1, 988

(56) References Cited

U.S. PATENT DOCUMENTS

| | | | | | |
|---|---|---|---|---|---|
| 4,225,950 | A | * | 9/1980 | Kotera et al. | 367/97 |
| 5,475,620 | A | * | 12/1995 | Kuzuya et al. | 702/143 |
| 6,279,396 | B1 | * | 8/2001 | Imagawa et al. | 73/597 |
| 6,343,869 | B1 | * | 2/2002 | Kobayashi | 362/37 |
| 6,385,540 | B1 | * | 5/2002 | Ajima | 701/213 |
| 6,480,783 | B1 | * | 11/2002 | Myr | 701/117 |
| 6,484,087 | B2 | * | 11/2002 | Shirai et al. | 701/96 |
| 6,604,048 | B2 | * | 8/2003 | Ishida et al. | 701/213 |

* cited by examiner

Primary Examiner—Tan Q. Nguyen
Assistant Examiner—Dalena Tran
(74) Attorney, Agent, or Firm—Morgan Lewis & Bockius LLP

(57) ABSTRACT

A vertical position of a vehicle running on a multi-layer road is determined on the basis of distances to reflecting objects found with reflected waves scanned in upward directions from the vehicle.

18 Claims, 2 Drawing Sheets

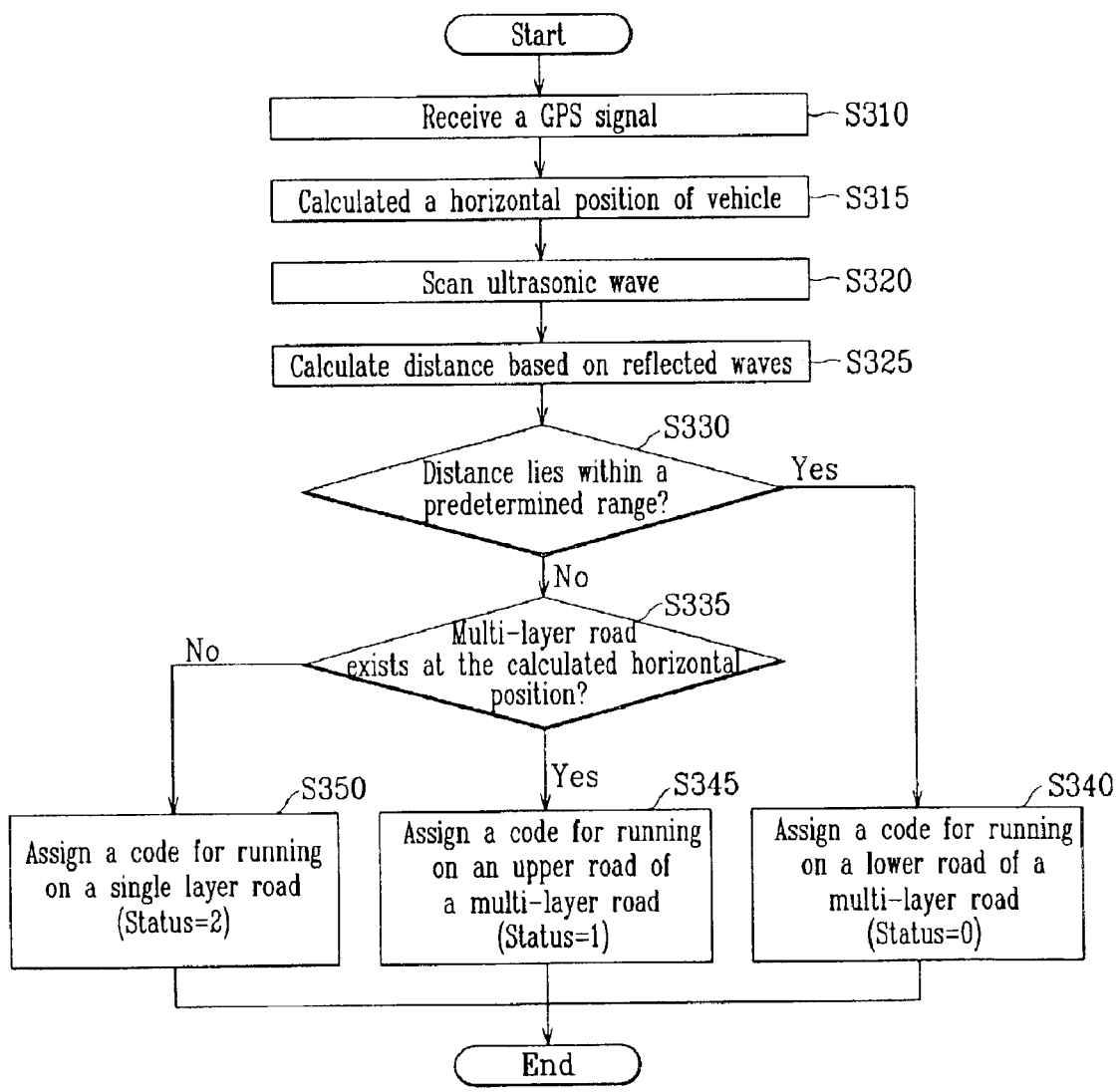

METHOD AND APPARATUS FOR DETERMINING VEHICLE POSITION ON A MAP

FIELD OF THE INVENTION

The present invention relates to a method and apparatus for determining a vehicle position on a map, and more particularly, to precisely determining a vehicle position on a map when the vehicle is running on a multi-layer road.

BACKGROUND OF THE INVENTION

Recently, navigation systems for displaying a current vehicle position on a map have been widely adopted in vehicles. A typical navigation system calculates the current vehicle position on the basis of a GPS (Global Positioning System) signal received from a GPS satellite, and displays the calculated vehicle position on a display device.

A complication is introduced in navigation because vehicles not only run on simple roads formed on land, but also run on roads having a plurality of road layers (referred to as "multi-layer road" in the whole specification) such as an overpass or flyover. In the case that a vehicle is running on an upper road or lower road of a multi-layer road, typical navigation systems do not precisely determine whether the vehicle is running on the upper road or on the lower road, such that sometimes guiding of the vehicle route becomes erroneous.

For example, in the case that a vehicle is running on an upper road of a multi-layer road where there is no exit or crossway, the navigation system may display guiding instructions of "left turn" or "right turn" because the navigation system may incorrectly determine that the vehicle is running on the lower road where such exit or crossway exists. This kind of malfunctioning of a navigation system has been proven to be more frequent in the case in which the navigation system commences operation when the vehicle is running on the multi-layer road.

The information disclosed in this Background of the Invention section is only for enhancement of understanding of the background of the invention, and should not be taken as an acknowledgement or any form of suggestion that this information forms prior art that is already known to a person skilled in the art.

SUMMARY OF THE INVENTION

The present invention provides for more precise determination of vehicle position when the vehicle is running on a multilayer road. In an exemplary apparatus for determining vehicle position on a map according to the present invention, a GPS signal receiver receives a GPS signal from a GPS satellite. An ultrasonic scanner detects distance to a reflecting object by scanning an ultrasonic wave in one or more upward directions. A data storage unit stores map data of the map where the vehicle is running and a processing unit determines the vehicle position on the map on the basis of the received GPS signal, a signal from the ultrasonic scanner, and the map data stored in the data storage unit.

In an exemplary method for determining vehicle position on a map according to the present invention a distance to a reflecting object is determined by scanning ultrasonic waves in one or more predetermined upward directions. Based on the distance to the reflecting object, a type of road on which the vehicle is running is determined.

In a further embodiment, the determining of the type of road includes assigning a first predetermined code to a predetermined position parameter when the distance to the reflecting object is within a predetermined range in at least one direction of said one or more predetermined upward directions. In a yet further embodiment, the determining of the type of road assigns another code, different from the first predetermined code, to the predetermined position parameter when the distance to the reflecting object is out of the predetermined range in all of said one or more predetermined upward directions.

In a still yet further embodiment, an exemplary method for determining a vehicle position on a map includes receiving a GPS signal from a GPS satellite, calculating a horizontal vehicle position on a map based on the received GPS signal, and determining if a multi-layer road exists at the calculated horizontal vehicle position on the map. Determining the type of road further includes assigning a second predetermined code to the predetermined position parameter when the distance to the reflecting object is out of the predetermined range in all of said one or more predetermined upward directions, and a multi-layer road exists at the calculated horizontal vehicle position on the map; and assigning a third predetermined code to the predetermined position parameter when the distance to the reflecting object is out of the predetermined range in all of said one or more predetermined upward directions, and a multi-layer road does not exist at the calculated horizontal vehicle position on the map.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3 is a flowchart of a method for determining a vehicle position on a map according to a preferred embodiment of the present invention.

DETAILED DESCRIPTION OF THE PREFERRED EMBODIMENTS

A preferred embodiment of the present invention will hereinafter be described in detail with reference to the accompanying drawings.

Figure 1:
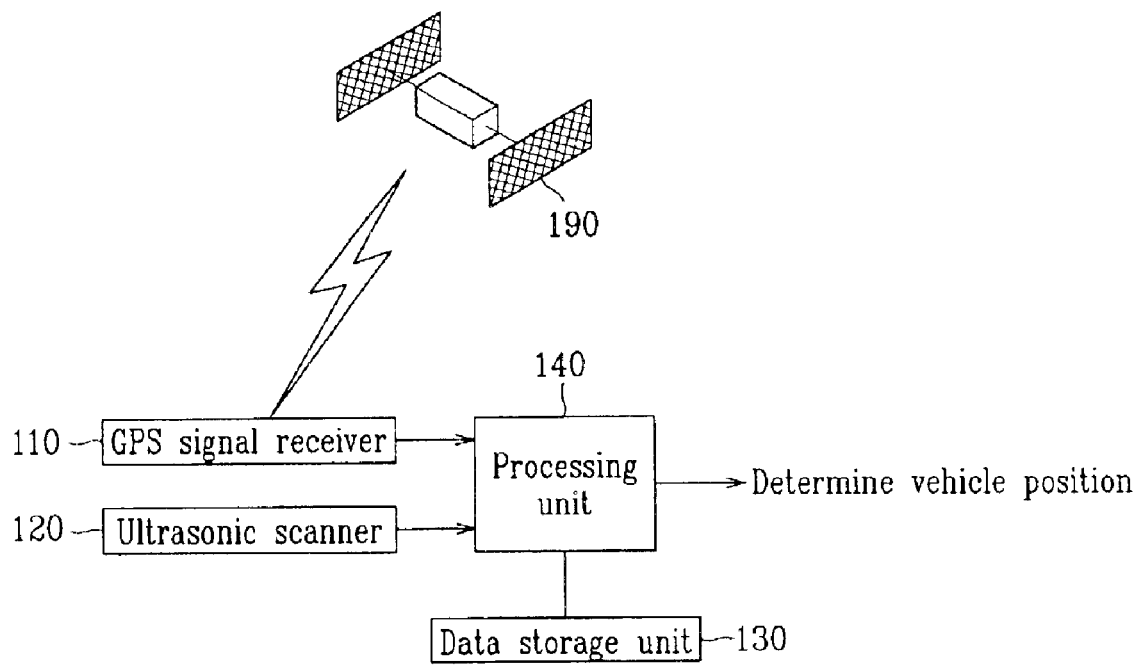
FIG. 1 is a block diagram of an apparatus for determining a vehicle position on a map according to a preferred embodiment of the present invention.

As shown in FIG. 1, an apparatus for determining a position of a vehicle on a map includes a GPS signal receiver 110 for receiving a GPS signal from a GPS satellite 190, an ultrasonic scanner 120 for detecting a distance to a reflecting object by scanning an ultrasonic wave in one or more upward directions from the vehicle, a data storage unit 130 for storing map data of the map where the vehicle is running, and a processing unit 140 for determining the vehicle position on the map on the basis of the received GPS signal, the signal from the ultrasonic scanner 120, and the map data stored in the data storage unit 130. In a preferred embodiment, the processing unit executes each step of a method for determining the vehicle position according to a preferred embodiment of the present invention as described herein.

The apparatus for determining the vehicle position according to a preferred embodiment of the present invention may be adopted as a part of a navigation system for guiding a vehicle route. In this regard, the GPS signal receiver 110 may be a conventional, commercially available receiver as will be appreciated by persons of ordinary skill in the art and will not be described in further detail.

Figure 2:
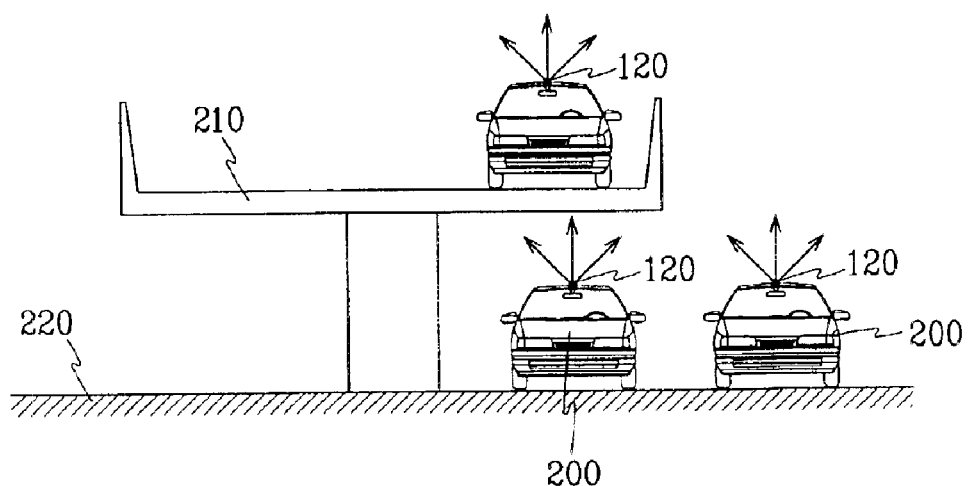
FIG. 2 illustrates an operation that a vehicle equipped with an apparatus of a preferred embodiment undergoes when it is running on a multi-layer road.

The ultrasonic scanner 120 is preferably disposed at an upper portion of the vehicle 200 as shown in FIG. 2, in order to scan ultrasonic waves in one or more upward directions from the vehicle 200. The ultrasonic scanner 120 scans (or radiates) the ultrasonic wave in the upward directions regardless of whether the vehicle 200 is running on an upper road 210 or a lower road 220 of a multi-layer road. The above described one or more upward directions preferably include a vertically upward direction, and directions leftwardly and rightwardly declined thereto as schematically illustrated by the arrows in FIG. 2.

The data storage unit 130 may be realized as any kind of device that can temporarily or permanently store map data, such as a CDROM, a DVD, or a semiconductor memory.

The processing unit 140 can be realized by one or more processors activated by predetermined software, and the predetermined software can be programmed to perform each step of a method for determining a vehicle position on a map according to a preferred embodiment of the present invention.

A method for determining a vehicle position on a map according to a preferred embodiment of the present invention is described in detail hereinafter, with reference to FIG. 3.

As shown in FIG. 3, the processing unit 140 firstly receives a GPS signal relevant to the vehicle 200 from the GPS satellite 190 through the GPS signal receiver 110 at step S310. The processing unit 140 then calculates a horizontal vehicle position of the vehicle 200 on a map, based on the received GPS signal at step S315.

Subsequently, using the ultrasonic scanner 120, the processing unit 140 scans (that is, radiates ultrasonic waves in three upward directions: a vertically upward direction, and directions leftwardly and rightwardly declined thereto) at step S320, and calculates a distance to a reflecting object based on reflected waves of the scanned ultrasonic waves at step S325. The step S325 of calculating a distance based on reflected waves will be apparent to a person skilled in the art, and is not described in further detail. However, it is notable that the distance in a specific direction may be set to be a predetermined value when no reflected wave has been received in the specific direction.

When the distance is calculated in each direction, the processing unit 140 determines if the distance to a reflecting object is within a predetermined range in at least one direction at step S330. When the distance to the reflecting object is determined to lie within the predetermined range in at least one direction at step S330, it can be determined that the vehicle 200 is running on the lower road 220 of the multi-layer road. In this case, the processing unit 140 assigns a first predetermined code, for example "0", to a predetermined position parameter "Status" at step S340, the value of the predetermined code, in this example "0", denoting that the vehicle 200 is running on the lower road of a multi-layer road.

When the distance to the reflecting object is determined to not lie within the predetermined range in any direction at step S330, the processing unit 140 assigns another code, different from the first predetermined code, to the position parameter "Status".

The above-described "another code" may be determined in the following steps. Firstly, the processing unit 140 determines if a multi-layer road exists at the calculated horizontal vehicle position of the map at step S335. When a multi-layer road is determined to exist at the calculated horizontal vehicle position at step S335, it may be concluded that the vehicle 200 is running on an upper road of the multi-layer road. On the contrary, it may be concluded that the vehicle 200 is running on a single-layer road when a multi-layer road is determined to not exist at the calculated horizontal vehicle position at step S335.

Therefore, the processing unit 140 assigns a second predetermined code, for example "1", to the predetermined position parameter "Status" at step S345, when the distance to the reflecting object is out of the predetermined range in all of said one or more predetermined upward directions, and a multi-layer road exists at the calculated horizontal vehicle position of a map. In addition, the processing unit 140 assigns a third predetermined code, for example "2", to the predetermined position parameter "Status" at step S350 when the distance to the reflecting object is out of the predetermined range in all of said one or more predetermined upward directions, and a multi-layer road does not exist at the calculated horizontal vehicle position of a map.

The specific values of the first, second, and third codes respectively assigned at steps S340, S345, and S350 may be altered to any other values according to a person skilled in the art.

Therefore, a navigation system that is equipped with an apparatus of a preferred embodiment of the present invention can precisely determine a current position of a vehicle, and it can therefore enable provision of more precise guiding of a vehicle route.

According to a preferred embodiment of the present invention, whether a vehicle is running on an upper road or lower road of a multi-layer road can be precisely determined. Therefore, such a function may enhance accuracy and precision of a navigation system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for determining a vehicle position on a map, comprising:
    determining a distance to a reflecting object by scanning ultrasonic waves in one or more predetermined upward directions, the one or more predetermined upward directions comprising at least one generally vertical direction; and
    determining, based upon the distance to the reflecting object, a type of road on a map on which the vehicle is running.

2. The method of claim 1, wherein said determining the type of road comprises assigning a first predetermined code to a predetermined position parameter when the distance to the reflecting object is within a predetermined range in at least one direction of said one or more predetermined upward directions.

3. The method of claim 2, wherein said determining the type of roads assigns another code, different from the first predetermined code, to the predetermined position parameter when the distance to the reflecting object is out of the predetermined range in all of said one or more predetermined upward directions.

4. The method of claim 3, further comprising:
receiving a GPS signal from a GPS satellite;
calculating a horizontal vehicle position on a map based on the received GPS signal; and
determining if a multi-layer road exists at the calculated horizontal vehicle position on the map,
wherein said determining the type of road further comprises:
assigning a second predetermined code to the predetermined position parameter when the distance to the reflecting object is out of the predetermined range in all of said one or more predetermined upward directions, and a multi-layer road exists at the calculated horizontal vehicle position on the map; and
assigning a third predetermined code to the predetermined position parameter when the distance to the reflecting object is out of the predetermined range in all of said one or more predetermined upward directions, and a multi-layer road does not exist at the calculated horizontal vehicle position on the map.

5. An apparatus for determining a vehicle position on a map, comprising:
a GPS signal receiver for receiving a GPS signal from a GPS satellite;
an ultrasonic scanner for detecting a distance to a reflecting object by scanning an ultrasonic wave in one or more upward directions, the one or more upward directions comprising at least one generally vertical direction;
a data storage unit for storing map data of the map where the vehicle is running; and
a processing unit for determining the vehicle position on the map on the basis of the received GPS signal, a signal from the ultrasonic scanner, and the map data stored in the data storage unit.

6. The apparatus of claim 5, wherein the processing unit executes software comprising instructions for:
determining a distance to a reflecting object by scanning ultrasonic waves in one or more predetermined upward directions; and
determining, based on the distance to the reflecting object, a type of road on which the vehicle is running.

7. The apparatus of claim 6, wherein said determining the type of road comprises assigning a first predetermined code to a predetermined position parameter when the distance to the reflecting object is within a predetermined range in at least one direction of said one or more predetermined upward directions.

8. The apparatus of claim 7, wherein said determining the type of road assigns another code, different from the first predetermined code, to the predetermined position parameter when the distance to the reflecting object is out of the predetermined range in all of said one or more predetermined upward directions.

9. The apparatus of claim 8, wherein the software further comprises instructions for:
receiving a GPS signal from a GPS satellite;
calculating a horizontal vehicle position on a map based on the received GPS signal; and
determining if a multi-layer road exists at the calculated horizontal vehicle position of the map,
wherein said determining the type of road further comprises:
assigning a second predetermined code to the predetermined position parameter when the distance to the reflecting object is out of the predetermined range in all of said one or more predetermined upward directions, and multi-layer road exists at the calculated horizontal vehicle position of the map; and
assigning a third predetermined code to the predetermined position parameter when the distance to the reflecting object is out of the predetermined range in all of said one or more predetermined upward directions, and a multi-layer road does not exist at the calculated horizontal vehicle position of the map.

10. A method for determining a vehicle position on a multi-layer road, comprising:
determining a distance to a reflecting object by scanning ultrasonic waves from a vehicle in one or more predetermined upward directions substantially perpendicular to, and away from, the road surface; and
determining, based upon the distance to the reflecting object, a type of road on which the vehicle is running.

11. The method of claim 10, wherein said determining the type of road comprises assigning a first predetermined code to a predetermined position parameter when the distance to the reflecting object is within a predetermined range in at least one direction of said one or more predetermined upward directions.

12. The method of claim 11, wherein said determining the type of roads assigns another code, different from the first predetermined code, to the predetermined position parameter when the distance to the reflecting object is out of the predetermined range in all of said one or more predetermined upward directions.

13. The method of claim 12, further comprising:
receiving a GPS signal from a GPS satellite;
calculating a horizontal vehicle position on a road based on the received GPS signal; and
determining if a multi-layer road exists at the calculated horizontal vehicle position on the road,
wherein said determining the type of road further comprises:
assigning a second predetermined code to the predetermined position parameter when the distance to the reflecting object is out of the predetermined range in all of said one or more predetermined upward directions, and a multi-layer road exists at the calculated horizontal vehicle position on the map; and
assigning a third predetermined code to the predetermined position parameter when the distance to the reflecting object is out of the predetermined range in all of said one or more predetermined upward directions, and a multi-layer road does not exist at the calculated horizontal vehicle position on the map.

14. An apparatus for determining a vehicle position on a multi-layer road, comprising:
a GPS signal receiver for receiving a GPS signal from a GPS satellite;
an ultrasonic scanner for detecting a distance to a reflecting object by scanning an ultrasonic wave in one or more upward directions substantially perpendicular to, and away from, a road surface;
a data storage unit for storing map data of the map where the vehicle is running; and
a processing unit for determining the vehicle position on the map on the basis of the received GPS signal, a signal from the ultrasonic scanner, and the map data stored in the data storage unit.

15. The apparatus of claim 14, wherein the processing unit executes software comprising instructions for:

determining a distance to a reflecting object by scanning ultrasonic waves in one or more predetermined upward directions substantially perpendicular to, and away from, a road surface; and determining, based on the distance to the reflecting object, a type of road on which the vehicle is running.

16. The apparatus of claim 15, wherein said determining the type of road comprises assigning a first predetermined code to a predetermined position parameter when the distance to the reflecting object is within a predetermined range in at least one direction of said one or more predetermined upward directions.

17. The apparatus of claim 16, wherein said determining the type of road assigns another code, different from the first predetermined code, to the predetermined position parameter when the distance to the reflecting object is out of the predetermined range in all of said one or more predetermined upward directions.

18. The apparatus of claim 17, wherein the software further comprises instructions for:

receiving a GPS signal from a GPS satellite;

calculating a horizontal vehicle position on a road based on the received GPS signal; and determining if a multi-layer road exists at the calculated horizontal vehicle position of the map, wherein said determining the type of road further comprises:

assigning a second predetermined code to the predetermined position parameter when the distance to the reflecting object is out of the predetermined range in all of said one or more predetermined upward directions, and multi-layer road exists at the calculated horizontal vehicle position of the road; and assigning a third predetermined code to the predetermined position parameter when the distance to the reflecting object is out of the predetermined range in all of said one or more predetermined upward directions, and a multi-layer road does not exist at the calculated horizontal vehicle position of the road.

* * * * *